United States Patent [19]
Kestly et al.

[11] Patent Number: 5,558,344
[45] Date of Patent: Sep. 24, 1996

[54] EXHAUST PIPE FLANGE GASKET

[75] Inventors: Michael J. Kestly, Bolingbrook, Ill.; Rob Lehmann, Fort Wayne, Ind.

[73] Assignee: Dana Corporation, Toledo, Ohio

[21] Appl. No.: 474,590

[22] Filed: Jun. 7, 1995

Related U.S. Application Data

[63] Continuation-in-part of Ser. No. 156,162, Nov. 23, 1993, abandoned.

[51] Int. Cl.$^6$ ................................ F16J 9/00; F16L 17/00
[52] U.S. Cl. .................... 277/167.5; 277/207 A; 277/235 R; 285/368; 285/379; 285/910
[58] Field of Search ................ 277/167.5, 235 B, 277/235 R, 229, 207 A, 5, 6, 12, 171, 178, 182, 183, 189; 285/910, 366, 412, 349, 363, 368, 379

[56] References Cited

U.S. PATENT DOCUMENTS

| | | |
|---|---|---|
| 1,847,729 | 10/1928 | Shaw . |
| 3,108,818 | 10/1963 | Furstenburg ............... 277/189 |
| 3,167,324 | 1/1965 | Kratochvil ................. 277/235 |
| 3,313,553 | 4/1967 | Gastineau ................. 277/239 |
| 3,635,480 | 1/1972 | Bain et al. ................ 277/180 |
| 3,877,708 | 4/1975 | Skrycki .................... 277/235 |
| 3,918,725 | 11/1975 | Dryer ...................... 277/167.5 |
| 4,147,274 | 4/1979 | Hall et al. ................ 277/229 |
| 4,272,085 | 6/1981 | Fujikawa et al. ........... 277/235 |
| 4,376,539 | 3/1983 | Baldacci ................... 277/1 |
| 4,676,515 | 6/1987 | Cobb ....................... 277/235 |
| 4,802,698 | 2/1989 | Fujisawa et al. ........... 285/363 |

FOREIGN PATENT DOCUMENTS

3809017A1  9/1989  Germany .

Primary Examiner—Daniel G. DePumpo
Attorney, Agent, or Firm—Rader, Fishman & Grauer PLLC

[57] ABSTRACT

A joint for mating exhaust pipes includes an exhaust pipe flange gasket with a metallic body having a planar portion extending laterally inwardly from an outer edge of the body, the planar portion having at least one bolt hole, and a shielding grommet integrally connected to an inner edge of the planar portion. The shielding grommet defines an outer periphery of an aperture, and a sealing element is retained within the grommet. The gasket is disposed between two mating exhaust pipes each pipe having a flange with an aperture and a planar clamping face, at least one of the flanges including a recess adjacent the clamping face. The planar portion of the gasket is disposed between the faces such that when the apertures of the members are aligned with the bolt hole, the shielding grommet is received in the recess.

18 Claims, 3 Drawing Sheets

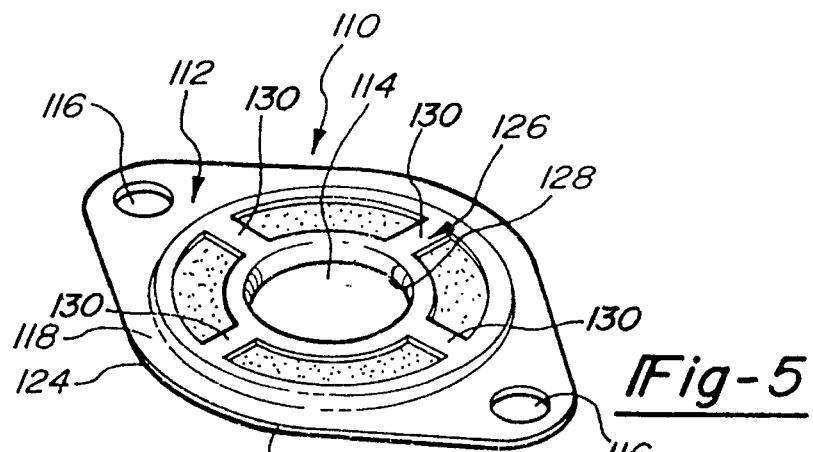
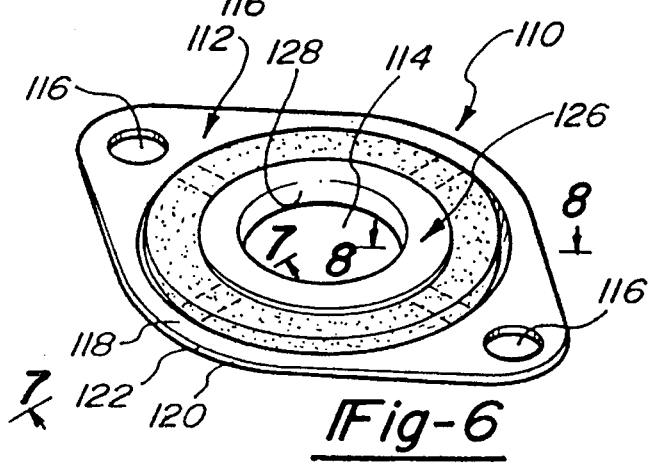
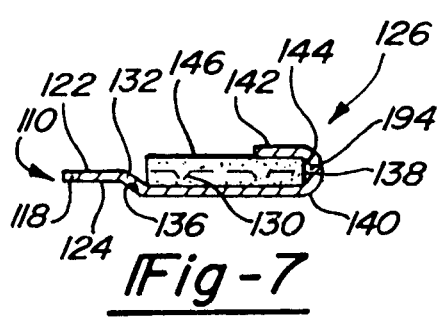
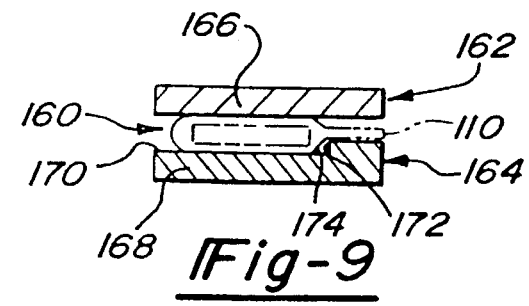
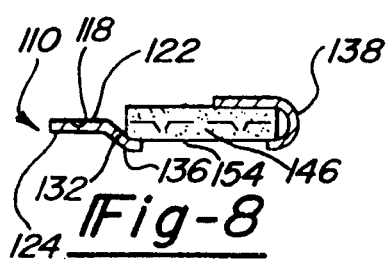
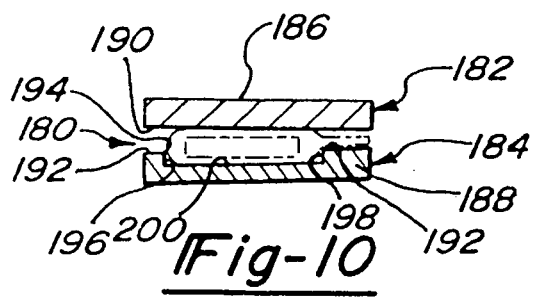

EXHAUST PIPE FLANGE GASKET

This is a continuation-in-part of application Ser. No. 08/156,162 filed on Nov. 23, 1993, now abandoned.

FIELD OF THE INVENTION

The present invention relates to a gasket and more particularly to a joint for mating exhaust pipes, the joint including an exhaust pipe flange gasket with a body having a planar portion and a shielding grommet which retains a gasket sealing element.

BACKGROUND OF THE INVENTION

An exhaust pipe flange gasket bears a clamping load from a bolted joint involving the connection of two pipe-like members having flanges and opposing planar faces. The gasket relies upon that load to prevent exhaust gases and other materials from escaping through the joint from one member to the other.

One known gasket comprises composite material which compresses under installation pressure, causing mating flanges to deform and bend. A non-uniform sealing stress distribution may be created, depending on the degree of flange deformation and the corresponding variable gasket compression. Further, the material is exposed to exhaust gases that can degrade the composite material. A shielding grommet may be added, but higher stresses resulting from the grommet may aggravate the flange deformation.

Another known ring-like gasket requires a machined groove or recess in the mating flange for the proper installation of the gasket. Gasket stress and compression are determined by the construction of the gasket and the depth of the recess. When the gasket is fully compressed in the recess, a positive metal to metal lock may be achieved at mating opposing planar faces of the flanges to minimize bending. However, the installation location of the gasket is dependent on the location of the recess and the ability to maintain gasket position during installation. One method of devising a positive lock location of the gasket is to create an interference fit between an inner diameter of the recess and the minor inner diameter of an elliptically shaped ring-like gasket. Close tolerances are required between the machined recess and the gasket.

A ring-like gasket may also be installed over an extended length pipe-like member having a planar face adapted to mate with a planar face of a corresponding member. For most applications, however, alignment of the respective opposing planar faces is extremely difficult because of the extended length of the pipe-like member. Further, interference fits are difficult because of outer diameter variability related to the pipe-like member.

Finally, a ring-like gasket may be installed in a recess of a flanged pipe-like member and held in place by gravity. However, the member is usually angled during assembly, allowing the gasket to fall out of the recess.

SUMMARY OF THE INVENTION

An improved exhaust pipe flange gasket for use with a joint for mating exhaust pipes includes a metallic body with a planar portion extending laterally inwardly from an outer edge of the body and both an upper and lower surface. The planar portion has at least one bolt hole and a shielding grommet integrally connected to an inner edge of the planar portion. The shielding grommet defines an outer periphery of an aperture. A sealing element is retained within the shielding grommet and includes an exposed portion. The sealing element comprises a high temperature resistant resilient material.

The shielding grommet comprises a first leg connected to the inner edge of the planar portion. A second leg extends laterally inwardly from the lower end of the first leg. A rim extends longitudinally upwardly from the laterally inner portion of the second leg. A third leg extends laterally outwardly from the upper portion of the rim. In a preferred embodiment, the third leg has a shorter length than the second leg and the rim includes a generally concave arcuate cross-section. The shielding grommet may have a continuous cross-section or the second leg may be connected to the first leg at a plurality of discrete positions about the aperture.

The gasket is positioned between two metallic pipe-like members. Each member has a flange with a longitudinally extending aperture and a laterally extending planar clamping face. At least one of the flanges includes a recess adjacent to the clamping face. Typical recesses include counter bores or channels. A key feature of the invention is that the member apertures are positioned such that when the planar portion of the gasket is disposed between the opposing faces of the flanges and the apertures are aligned with the bolt hole of the gasket, the shielding grommet is received in a recess. Thus, the installation positioning of the gasket is determined through the use of the bolt holes.

In a preferred embodiment, the bolt holes are generally triangular with the inscribed diameter of a tangent circle defined by the edges of the bolt holes being less than the outer diameter of a corresponding bolt thread. Thus, an interference fit is assured between a bolt hole and a corresponding bolt to prevent fastener separation from the gasket. Further, overall gasket positioning is optimized because there is little if any relative movement between a bolt and the edges of a corresponding bolt hole.

As a result, recess tolerances are not nearly as important. Therefore, the recesses may be formed using many different operations including coining, machining, and casting.

The depth of the recesses determines the degree of gasket compression, which is proportionate to a sealing stress placed on the gasket. The area of the shielding grommet in metal to metal contact with the opposing planar faces acts as a primary seal. A secondary seal is provided by an area of actual contact between the exposed portions of the sealing element and the opposing faces.

BRIEF DESCRIPTION OF THE DRAWINGS

The features and inventive aspects of the present invention will become more apparent upon reading the following detailed description, claims, and drawings, of which the following is a brief description:

FIG. 5 is a perspective view highlighting one of the surfaces of a second embodiment of the gasket.

FIG. 6 is a perspective view highlighting a different surface of the second embodiment of a gasket.

FIG. 7 is a cross-sectional view of the second embodiment of the gasket taken along lines 7—7 in FIG. 6.

FIG. 8 is a cross-sectional view of the second embodiment of the gasket taken along lines 8—8 in FIG. 6.

FIG. 9 is partial cross-sectional view of a joint using the second embodiment of the gasket.

FIG. 10 is a partial cross-sectional view of a joint using the second embodiment of the gasket.

DESCRIPTION OF PREFERRED EMBODIMENTS

Figure 1:
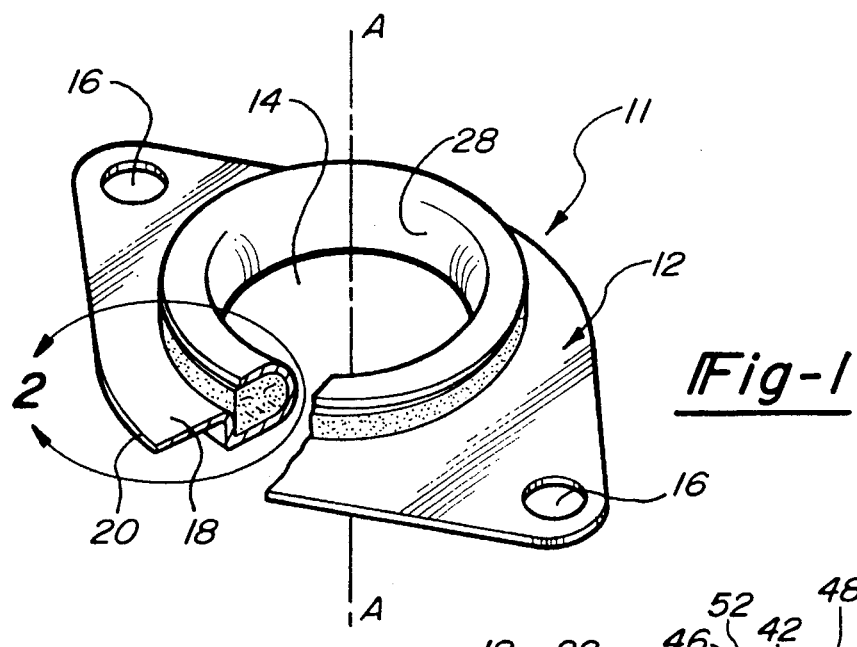
FIG. 1 is a perspective view of a first embodiment of a gasket according to the present invention.
Figure 2:
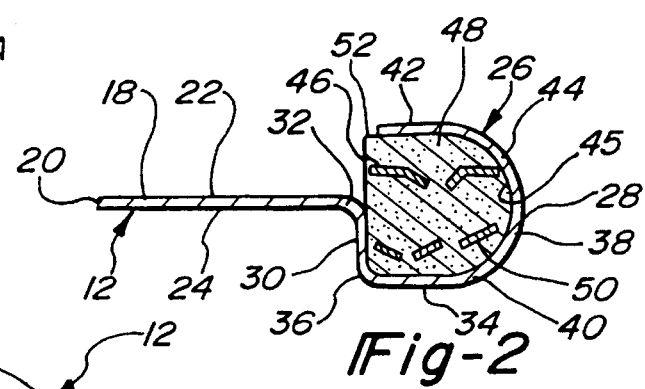
FIG. 2 is a cross-sectional view of the first embodiment of the gasket as shown within the encircled region 2 of FIG. 1.
Figure 3:
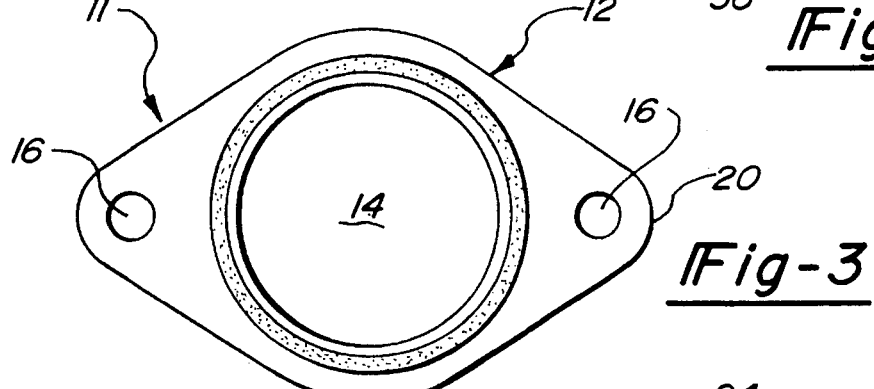
FIG. 3 is a planar view of the first embodiment of the gasket of FIG. 1.

An exhaust pipe flange gasket 11 is shown in FIG. 1. Gasket 11 includes a body 12 with a service aperture 14 and a pair of bolt holes 16. Aperture 14 is used for the passage of material from an exhaust pipe member. Body 12 is preferably metallic, and more preferably stainless steel. As shown in FIGS. 1 through 3, body 12 includes a planar portion 18 extending laterally inwardly from an outer edge 20 of body 12. Planar portion 18 includes an upper surface 22 and a lower surface 24.

Body 12 also includes a shielding grommet 26 integrally connected to planar portion 18. Shielding grommet 26 has a continuous cross-section that defines an outer periphery 28 about a longitudinal axis A—A of aperture 14. While the outer periphery 28 of aperture 14 is annular in the disclosed embodiment, such an annular shape is not required. For example, outer periphery 28 may be oval or rectangular.

Shielding grommet 26 includes a first leg 30 connected to an inner edge 32 of planar portion 18 that extends longitudinally downwardly. A second leg 34 extends laterally inwardly from a lower end 36 of first leg 30. A rim 38 extends longitudinally upwardly from a laterally inner portion 40 of second leg 34. Finally, a third leg 42 extends laterally outwardly from an upper portion 44 of rim 38. In a preferred embodiment, planar portion 18 is equally spaced between legs 34 and 42. Rim 38 has a generally concave arcuate cross-section, but such a cross-section is not required in the present invention.

An interior 45 of shielding grommet 26 is in an enfolding relationship with a sealing element 46 retained within the shielding grommet. Shielding grommet 26 protects sealing element 46 from material passing through aperture 14 of gasket 11. Sealing element 46 comprises a high temperature resistant resilient material such as Victocor 189 graphite. In the illustrated embodiment, sealing element 46 includes two separate layers 48 and 50. In a preferred embodiment, layers 48 and 50 have the same dimensions. Sealing element 46 also includes an exposed portion 52 that is not enclosed by the shielding grommet 26. The area of exposed portion 52 depends in large part on the length of leg 42. Thus, the length of leg 42 may be adjusted as required by the particular application. Preferably, however, leg 42 is shorter than leg 34 because of manufacturing constraints involved in forming body 12, particularly if body 12 is stamped.

Figure 4:
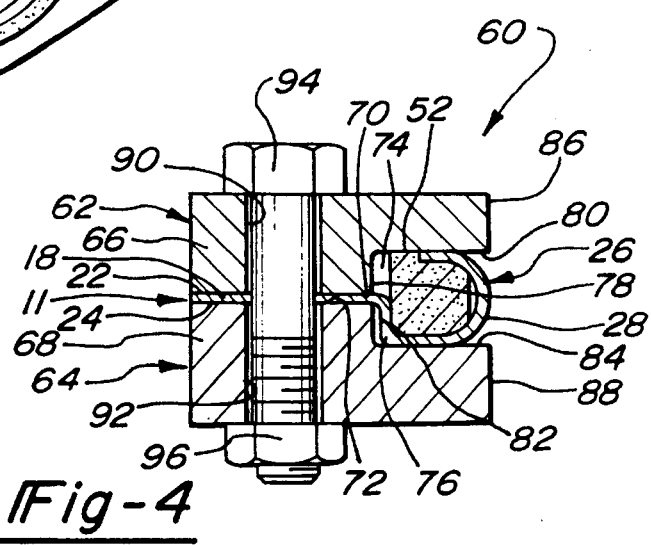
FIG. 4 is a partial cross-sectional view of a joint using the first embodiment of the gasket according to the present invention.

The use of gasket 11 with a joint 60 is illustrated in FIG. 4. Joint 60 includes two metallic pipe-like members 62 and 64 with flanges 66 and 68, respectively. Preferably, both members 62 and 64 are formed from steel. Flanges 66 and 68 have opposing planar clamping faces 70 and 72. Each flange 66 and 68 includes a counter bore recess 74 and 76 adapted to accept a portion of shielding grommet 26. Recess 74 has an inner longitudinally extending wall 78 that defines the depth of recess 74, and a laterally extending wall 80. Similarly, recess 76 has an inner longitudinally extending wall 82 that defines the depth of recess 76, and a laterally extending wall 84. In a preferred embodiment, inner edges 86 and 88 of members 62 and 64 are adapted to be generally coplanar with the outer periphery 28 of gasket 11, while walls 78 and 82 preferably have the same general longitudinal dimension.

Gasket 11 is positioned and locked by a fastener passing through a longitudinally extending aperture 90 of flange 66, a bolt hole 16 of body 12, and an aligned longitudinally extending aperture 92 of flange 68. Faces 70 and 72 come into locking contact with surfaces 22 and 24 of planar portion 18 to create a metal to metal locked joint. Flange deflection and subsequent Joint relaxation is minimized. A preferred fastener includes the use of a bolt 94 and a nut 96.

An important feature of the present invention is that the installation positioning of the gasket 11 is determined using bolt holes 16, apertures 90,92, and bolt 94. While gasket 11 is designed such that shielding grommet 26 generally coincides with recesses 74 and 76, the installation positioning of gasket 11 is independent of the recesses. Therefore, unlike prior art gaskets, a tight tolerance is not required in the sealing area defined by recesses 74 and 76. As a result, recesses 74 and 76 can be formed using many different operations including machining, coining, and casting.

The depth of recesses 74 and 76 in conjunction with the shape and size of shielding grommet 26, determines the degree of gasket compression, which is proportionate to a sealing stress placed on gasket 11. Rim 38 is arcuate in cross-section partially because of the spring back that such a shape provides. The area of shielding grommet 26 in metal to metal contact with walls 80 and 84 acts as a primary seal since the indicated area of the grommet carries most of the sealing stress. The metal to metal contact helps to protect sealing element 46 from direct exposure to the material passing through joint 60. However, a secondary seal is provided by an area of actual contact between exposed portion 52 of sealing element 46 and wall 80 of recess 74.

A second embodiment of the present invention, a gasket 110, is shown in FIGS. 5 through 8. Gasket 110 includes a body 112 with a service aperture 114 and a pair of bolt holes 116. Bolt holes 116 serve the same installation positioning function as discussed above with respect to gasket 11. Body 112 includes a planar portion 118 extending laterally from an outer edge 120 of body 112. Planar portion 118 includes an upper surface 122 and a lower surface 124.

Body 112 includes a shielding grommet 126 integrally connected to planar portion 118. Shielding grommet 126 defines an outer periphery 128 of aperture 114.

Unlike with the first embodiment, however, shielding grommet 26 does not have a continuous cross-section. Instead, shielding grommet 126 is integrally connected to planar portion 118 at a plurality of discrete positions about a periphery 128 of aperture 114.

Four such integral connections or legs 130 are illustrated in FIG. 5 and a cross-section of one such connection is shown in FIG. 7. Material is removed from the metallic body 112 to form discrete legs 130 preferably using a blanking operation. Shielding grommet 126 has a first leg 132, but leg 132 does not extend longitudinally downwardly to the same extent as in the embodiment of FIG. 1. Second leg 130 extends laterally inwardly from a lower end 136 of first leg 132. A rim 138 having an arcuate cross-section extends longitudinally upwardly from a laterally inner portion 140 of leg 130. Finally, a third leg 142 extends laterally outwardly from an upper portion 144 of rim 138. In a preferred embodiment, leg 142 has less than half the length of leg 130.

An interior 145 of shielding grommet 126 is in an enfolding relationship with a sealing element 146 that is retained within the shielding grommet. Unlike with the first embodiment, however, the sealing element comprises a single layer, and the total longitudinal dimension of the sealing element is less than with the embodiment of FIG. 1. Because of the reduced length of leg 142, a greater exposed portion 152 of sealing element 146 exists.

Since leg 134 lacks a continuous cross-section, as illustrated in FIGS. 5 and 8, sealing element 146 includes a lower exposed portion 154 that is not present in the embodiment of FIG. 1. The area of shielding grommet 126 in metal to metal contact with the laterally extending recess walls of opposing flanges acts as a primary seal since the indicated area of the grommet carries most of the sealing stress. However, an improved secondary seal is provided by an area of actual contact between both oppositely disposed exposed portions 152 and 154 of sealing element 146 and a corresponding laterally extending portion of a pipe-like member with flanges.

The use of gasket 110 is illustrated in phantom in FIG. 9. A joint 160 is shown that is similar to that described in FIG. 4 with respect to gasket 11. Joint 160 includes the use of two metallic pipe-like members 162 and 164 with flanges 166 and 168, respectively. However, only flange 168 includes a counter bore recess 170 adapted to accept a portion of shielding grommet 126. Recess 170 includes an inner longitudinally extending wall 172 that defines the depth of recess 170, and a laterally extending wall 174.

The use of gasket 110 is also illustrated in phantom in FIG. 10. A joint 180 is illustrated. Joint 180 includes the use of two metallic pipe-like members 182 and 184 with flanges 186 and 188. Flanges 186 and 188 have opposing planar clamping faces 190 and 192. Flange 186 includes a channel defining a recess 194. Thus, face 192 is disposed on adjacent sides of recess 194. Recess 194 includes two longitudinally extending walls 196 and 198 and a laterally extending wall 200. The use of recess 194 may be preferable under some circumstances to provide additional stability to the joint and extra protection to the gasket.

Figure 11:
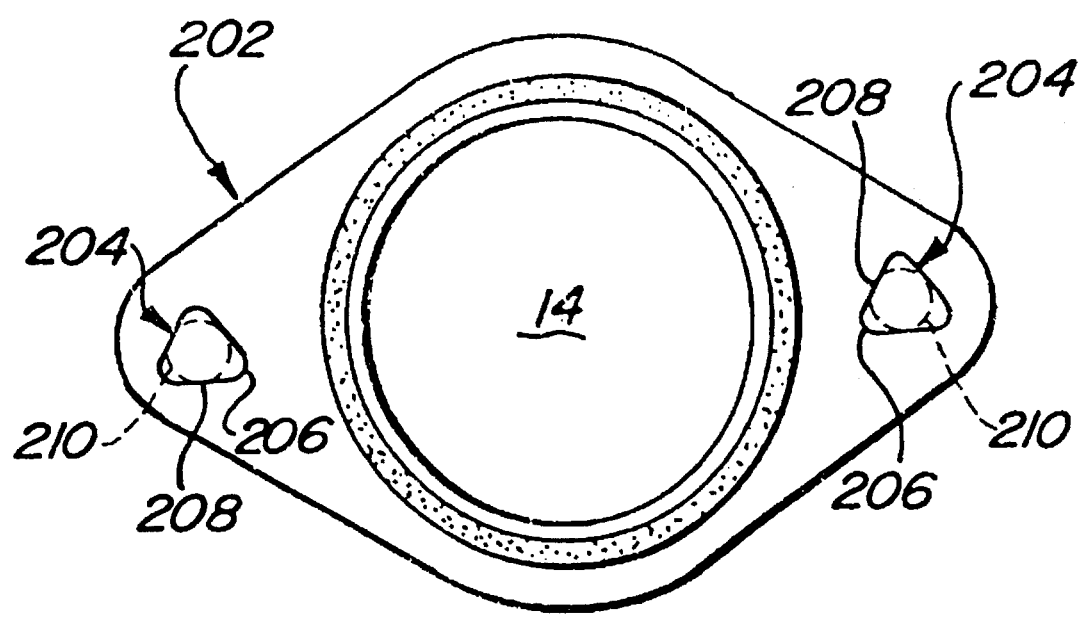
FIG. 11 is a planar view of a third embodiment of the present invention.

A third embodiment of the present invention is illustrated in FIG. 11. Flange gasket 202 is virtually identical to gasket 11 illustrated in FIGS. 1 through 4. However, rather than being generally circular, bolt holes 204 are generally triangular with rounded corners 206 and linear edges 208. The inscribed diameter of a tangent circle 210 defined by edges 208 is less than the outer diameter of a corresponding bolt thread of bolt 94, shown in FIG. 4. Thus, an interference fit is assured between bolt holes 204 and a corresponding bolt 94 to prevent fastener separation from gasket 202. Further, overall gasket positioning is optimized because there is little if any relative movement between bolt 94 and a corresponding bolt hole 204. Limited relative movement is preferred because the installation positioning of gasket 202 is determined using bolt holes 16, apertures 90, 92 of flanges 66, 68, and bolt 94 rather than recesses 74 and 76, as discussed above.

To assure a similar limited relative movement between bolt 94 and members 62 and 64, it may be desirable to form aperture 92 with threads adapted to engage bolt 94 rather than using nut 92. However, this will not typically be required. As discussed above, the installation positioning of the gasket is determined by aligning the bolt holes with member apertures in conjunction with the use of bolt 94. If less relative movement is required, the tolerances of apertures 90, 92 may be adjusted accordingly.

Preferred embodiments of the present invention have been described. It is to be understood that variations and modifications may be employed without departing from the scope of the present invention. Accordingly, the following claims should be studied to learn the true scope of the present invention.

We claim:

1. A joint comprising:
   a gasket, said gasket including a single metallic body with a planar portion extending laterally inwardly from an outer edge of said body and including an upper surface and a lower surface, said planar portion having at least one bolt hole, a shielding grommet formed from said body at an inner edge of said planar portion, said shielding grommet defining an outer periphery of an aperture extending about a longitudinal axis of said body, and a sealing element retained within said shielding grommet; and
   two metallic pipe-like members, each of said members having a flange with a longitudinally extending aperture and a laterally extending planar clamping face, and at least one of said flanges including a recess adjacent said clamping face, wherein said apertures are positioned such that when said planar portion of said gasket is disposed between said opposing faces of said flanges and said apertures are aligned with said bolt hole of said gasket, said shielding grommet is correctly positioned in said recess.

2. A joint as recited in claim 1, wherein said Joint includes a bolt passing through said bolt hole and said apertures, said bolt hole and said apertures sized such that said shielding grommet is correctly positioned in said recess when said bolt secures said gasket and said members together.

3. A joint as recited in claim 2, wherein said bolt hole includes edges defining an inscribed diameter of a tangent circle which is less than the outer diameter of said bolt.

4. A joint as recited in claim 1, wherein each of said flanges includes a recess adjacent to said clamping face adapted to receive a portion of said shielding grommet within said recess.

5. A joint as recited in claim 4, wherein said recesses are equally spaced from said apertures, each recess including an inner longitudinally extending wall that defines a depth of each said recess.

6. A joint as recited in claim 5, wherein each of said recesses include a common depth.

7. A joint as recited in claim 5, wherein each said recess comprises a channel, said face of each said flange disposed on adjacent sides of said channel.

8. A joint as recited in claim 1, wherein a primary seal is provided by an area of said shielding grommet in metal to metal contact with each of said flanges.

9. A joint as recited in claim 8, wherein at least one portion of said sealing element is exposed.

10. A joint as recited in claim 9, wherein a secondary seal is provided by an area of said exposed portion of sealing element in contact with at least one of said flanges.

11. A joint as recited in claim 9, wherein exposed portions of said sealing element are in contact with each of said flanges.

12. A joint as recited in claim 1, wherein said sealing element comprises a high temperature resistant resilient material comprising primarily graphite.

13. A joint as recited in claim 1, wherein said shielding grommet includes a rim at said outer periphery to protect a portion of said sealing element.

14. A gasket, said gasket including:

a single metallic body with a planar portion extending laterally inwardly from an outer edge of said body and including an upper surface and a lower surface, said planar portion having at least one bolt hole, a shielding grommet formed from said body at an inner edge of said planar portion, said shielding grommet defining an outer periphery of an aperture extending about a longitudinal axis of said body;

a sealing element retained within said shielding grommet;

two metallic pipe-like members, each of said members having a flange with a longitudinally extending aperture and a laterally extending planar clamping face, wherein said flanges include equally spaced recesses having a common depth adjacent said clamping face; and a fastener passing through said bolt hole and said apertures, said bolt hole and apertures sized such that said shielding grommet is correctly positioned in said recesses when said fastener secures said gasket and said members together.

15. A joint as recited in claim 14, wherein said shielding grommet includes two laterally extending legs equally longitudinally spaced from said planar portion, said legs having an arcuate outer rim disposed therebetween.

16. A joint as recited in claim 15, wherein said bolt hole includes edges defining an inscribed diameter of a tangent circle which is less than the outer diameter of said bolt.

17. A joint as recited in claim 16, wherein said bolt hole includes a generally triangular shape, said tangent circle defined by the three sides of said bolt hole.

18. A joint as recited in claim 17, wherein said sealing element comprises a high temperature resistant resilient material comprising primarily graphite.

* * * * *